United States Patent

Minagawa et al.

[11] Patent Number: 5,916,927
[45] Date of Patent: Jun. 29, 1999

[54] PROCESS FOR PRODUCING NON-FLAMMABLE PHENOLIC RESIN FOAM

[75] Inventors: Mitsuo Minagawa; Osamu Minagawa, both of Komagane, Japan

[73] Assignee: Revall Co., Ltd., Komagane, Japan

[21] Appl. No.: 09/037,428

[22] Filed: Mar. 10, 1998

[30] Foreign Application Priority Data

Mar. 18, 1997 [JP] Japan .................................. 9-103775
Mar. 18, 1997 [JP] Japan .................................. 9-103777
May 22, 1997 [JP] Japan .................................. 9-167824

[51] Int. Cl.$^6$ ...................................................... C08J 9/32
[52] U.S. Cl. ............................. 521/54; 521/92; 521/181; 523/218; 523/219
[58] Field of Search ........................ 521/54, 181, 92; 523/218, 219

[56] References Cited

U.S. PATENT DOCUMENTS

| | | | |
|---|---|---|---|
| 2,797,201 | 6/1957 | Veatch et al. | 521/78 |
| 4,067,829 | 1/1978 | Garrett | 521/181 |
| 4,595,710 | 6/1986 | Albertelli et al. | 521/181 |
| 4,820,576 | 4/1989 | Duryea | 521/181 |
| 4,843,103 | 6/1989 | Albertelli et al. | 521/181 |

*Primary Examiner*—Morton Foelak
*Attorney, Agent, or Firm*—Larson & Taylor

[57] ABSTRACT

The non-flammable phenolic resin foam with plane surface and high fire resistance in this invention is produced by mixing 30 to 100 parts by weight of resol type phenolic resin, 0.3 to 10 parts by weight of foaming agent, 10 to 50 parts by weight of curing agent, 30 to 800 parts by weight of ceramic micro-hollow particles (compression strength of 600 kgf/cm$^2$ or more, bulk density of 0.3 to 0.5 g/cm$^3$ and melting point of 1500° C. or more), 2 to 250 parts by weight of inorganic filling agent, 40 to 250 parts by weight of aluminum hydroxide with water, press molding and heating for curing.

8 Claims, No Drawings

PROCESS FOR PRODUCING NON-FLAMMABLE PHENOLIC RESIN FOAM

FIELD OF THE INVENTION

The present invention relates to a process for producing the non-flammable phenolic resin foam of light weight and excellent heat insulation for use as building and construction members, such as wall material, roof material, floor material and fireproof storage and the like.

DESCRIPTION OF THE PRIOR ART

The conventional non-flammable plate materials for construction consist of inorganic material or metallic material both of which are of low heat insulation, low processability and heavy weighted, causing trouble in handling.

So as to improve these drawbacks, non-flammable phenolic resin foam has been developed as organic material so far. In this material, in order to make this phenolic resin foam non-flammable, aluminum hydroxide was added in the manufacturing stage of the phenolic resin foam. In order to further improve non-flammability, the phenolic resin foam material was also added with inorganic materials, such as, calcium silicate or calcium carbonate as a filling agent. Also in order to increase its strength, the phenolic resin foam material was added with inorganic fiber, such as, glass fiber as a reinforcing material.

Any non-flammable phenolic resin foam of the prior art had porous surface and was highly water absorptive which made it difficult to bond a face material such as decorative paper on its surface. In the process of foaming, the phenolic resin foam had many relatively large bubbles or voids inside the foam material, thus degrading its strength. To improve this drawback, glass fiber was mixed.

BRIEF SUMMARY OF THE INVENTION

The purpose of the present invention is to offer non-flammable phenolic resin foam with flat and plain surface having excellent fire-resistance.

Another purpose of the present invention is to offer non-flammable phenolic resin foam of relatively high density, of low water absorption and high physical strength.

DESCRIPTION OF THE PREFERRED EMBODIMENTS

In the non-flammable phenolic resin foam to be obtained by this invention, ceramic micro-hollow particles of high strength are used to contact with each other. These contacting points are bonded with phenolic resin, so the substrate is considerably light in weight with bulk density of 0.4 to 0.6 g/cm$^3$. Also in this invention, pressurizing operation during molding process makes the foam material construction relatively dense and very strong with compression strength of 600 kgf/cm$^2$ or more.

In the non-flammable phenolic resin foam in this invention, very strong ceramic micro-hollow particles keep the form of complete hollow spherical shape. These ceramic micro-hollow particles are bonded at their tangential points, so space other than bonded points allows the air to flow, in the form of many fine capillary tubes.

Because the non-flammable phenolic resin foam in this invention has air flowing pores in the form of capillary tubes spread like mesh of nets, the air is allowed to flow, even at the week air pressure of about 1 kgf/cm$^2$ applied, from front surface to inner side and finally to the open air through the peripherals. Even if the air is hot, most of the volume of the air from the front surface to inner side easily flows upward and left to right side, dispersing the temperature throughout the total area, and scarecely any back side temperature rises. In case, a fire flame comes in contact with the non-flammable phenolic resin foam, the air of the high temperature of the flame evenly flows into the total area of the foam and is dispersed. The temperature of the back surface rises less and the total substance works as a heat dispersing plate.

The phenolic resin used in this present invention is used to bind the contacting points of fine-hollow particles. The resin is low grade polymer phenolic resin in resol type liquid or powder and can be prepared from phenols and their variation, such as, phenol, cresol, xylenol, paralkylphenol, paraphenylphenol, or resorcinol, along with aldehyde, such as formaldehyde, paraformaldehyde, furfural, acetaldehyde reacted by alkali catalyst, such as sodium hydroxide, potassium hydroxide, calcium hydroxide, hexamethylene tetramine, trimethylamine or triethylamine. The resin is easily mixed with filling agent.

The foaming agent used in this invention is used to cause slight level of foaming and can be exemplified such as methylene chloride, carbonates, pentane, hexane, isopropyl ethers or the like. The quantity of such foaming agent to be used is as small as 0.3 to 10 parts by weight, preferably 3 to 10 parts by weight, more preferably 0.3 to 5 parts by weight against 30 to 100 parts by weight of resol type phenolic resin.

The curing agent used in this invention is generally used to cure phenolic resin and can be an inorganic acid, such as, sulfuric acid, phosphoric acid, or an organic acid, such as, benzenesulfonic acid, naphtholsulfonic acid or phenolsulfonic acid.

The ceramic micro-hollow particles used in this invention have compression strength of 600 kgf/cm$^2$ or more. Generally, the ceramic micro-hollow particles have higher compression strength, as the melting point of the material is higher. Therefore, the melting point of this material should be higher than 1500° C. With this provision, the material can withstand high stress and shearing force that is generated in the manufacturing process of the non-flammable phenolic resin foam. By press molding, it is also possible to produce dense non-flammable phenolic resin foam while it is light in weight.

The "compression strength" is the synonym of hydraulic pressure-resistant strength which is determined as follows: Charge the ceramic micro-hollow particles in water, pressurize the water, thereby compressing the ceramic micro-hollow particles in the water. The pressure limit before breaking is the compression strength.

To obtain non-flammable phenolic resin foam of excellent properties, it is important to sufficiently mix the composition of this invention in the mixing process. This process is especially important to obtain non-flammable phenolic resin foam of even and high quality. When sufficient mixing, such as kneading is performed to the composition of this invention, the stress and shearing force to be applied to the ceramic micro-hollow particles is approximately 400 kgf/cm$^2$. The micro-hollow particles of prior art, such as, shirasu balloon, glass balloon, silica balloon and flyash balloon are of compression strength of 80 to 300 kgf/cm$^2$. There is no micro-hollow particles that can withstand as high a pressure as mentioned above. As most of them are broken, use of such material is not practical to get sufficient properties.

As the ceramic micro-hollow particles used in this invention have higher strength than that of the conventional micro-hollow particles, the ceramic micro-hollow particles contained in the non-flammable phenolic resin foam are kept in 100% spherical shape.

The bulk density of the ceramic micro-hollow particles used in this invention is 0.3 to 0.5 g/cm$^3$. Since the ceramic micro-hollow particles have 100% complete sphere, their weight is extremely light. Since the ceramic microhollow particles used in this invention are kept in 100% perfect sphere, their heat conductivity is more or less 0.1 kcal/m.hr. °C. though it slightly differs according to the diameter of the particle. If one half of the micro-hollow particles are broken, their heat conductivity will drop to 0.2 kcal/m.hr. °C.

These ceramic micro-hollow particles are ceramic foamed particles of aluminosilicate consisting of silica composite in 50 to 60% by weight, alumina composite in 40 to 45% by weight, and other composite in 1.5 to 2.5% by weight. As the above composition indicates, other element is less in weight. The particles therefore have compression strength 700 kgf/cm$^2$ or higher, melting point 1600° C. or higher, bulk density 0.3 to 0.5 g/cm$^3$ and heat conductivity 0.1 kcal/m.hr. °C.

The diameter of the ceramic micro-hollow particles is within the range of 5 to 350 μm among which, fine mesh of 5 to 75 μm, medium mesh of 75 to 150 μm and coarse mesh of 150 to 350 μm are mixed to adjust suitable particle size to be used. Since the bulk density of the particle of small diameter is heavy while the bulk density of the particle of large diameter is light, its bulk density is within the range of 0.3 to 0.5 g/cm$^3$.

For resol type phenolic resin in 30 to 100 parts by weight, foaming agent in 0.3 to 10 parts by weight, preferably 3 to 10 parts by weight, more preferably 0.3 to 5 parts by weight, curing agent in 10 to 50 parts by weight, preferably 10 to 30 parts by weight are added. Into this mixture, the ceramic micro-hollow particles in 30 to 800, preferably 100 to 800 parts by weight is added. The 30 to 100 parts by weight of the particles against resol type phenolic resin in 30 to 100 parts by weight may be used for desired special applications with low cost. With the particles less than 30 parts by weight, sufficient fire-resistance or heat insulation is not available. On the other hand, if the particles are more than 800 parts by weight, strength will greatly decrease. It is possible to increase or decrease the quantity of ceramic micro-hollow particles according to the physical strength and specific gravity required.

The inorganic filling agent in this invention works to maintain the shape of molded construction as a substitute for the phenolic resin when the molded construction is subjected to high temperature due to fire or the like. As a filling agent, glass powder or fusing agent may be used.

The glass powder consists of silicate glass, a type of oxide glass, especially, soda-lime glass powder of $Na_2O$—$CaO$—$SiO_2$ family is most suitable. As for the fusing agent, suitable material is feldspar, anorthite, magnesium carbonate, calcium phosphate, lead oxide, boric acid, sodium carbonate, sodium nitrate or zinc oxide. As for the above inorganic filling agent, one or various types may be selected and used, if desired combined.

The diameter of the inorganic filling agent is preferably within the range of 5 and 100 μm.

The inorganic filling agent is added in 2 to 250 parts by weight, preferably 20 to 250 parts by weight, more preferably 100 to 250 parts by weight against resol type phenolic resin in 30 to 100 parts by weight. The 2 to 40 parts by weight of the inorganic filling agent against resol type phenolic resin in 30 to 100 parts by weight may be used for desired special applications with low cost.

If the volume of the above-mentioned filling agent is less than 20 parts by weight, molding form cannot be maintained when it is subjected to high temperature during fire or the like. If the above-mentioned filling agent is more than 250 parts by weight, the strength of the non-flammable phenolic resin foam will decrease.

The aluminum hydroxide used in this invention is effective to enhance non-flammability and fire-resistance of the non-flammable phenolic resin foam, as it absorbs heat by oxidizing itself when fire or the like occurs and changes itself to be an aluminum oxide of good fire-resistance. The optimum water content of the aluminum hydroxide is 0 to 30%. The optimum particle size is less than 100 μm while the optimum purity is 99%. The optimum mixing ratio of the aluminum hydroxide is 100 to 250 parts by weight, preferably 40 to 80 parts by weight against 30 to 100 parts by weight of resol type phenolic resin.

Besides the above, phosphate may also be used. Among many types of phosphate, which is the general name of the acid produced by hydration of phosphorus pentoxide, orthophosphoric acid is preferably used in this invention. This orthophosphoric acid contributes very much to enhance fire-resistance of the non-flammable phenolic resin because, when it is subjected to high temperature, it is oxidized and absorbs the heat and changes itself to pyrophosphoric acid of good heat-resistance. When the temperature rises further, it changes itself to methaphosphoric acid of better heat-resistance, enhancing fire resistance of phenolic resin foam. The mixing ratio of this phosphoric acid is 5 to 50 parts by weight, preferably 10 to 50 parts by weight against 30 to 100 parts by weight of resol type phenolic resin. The 5 to 30 parts by weight of the inorganic filling agent against resol type phenolic resin in 30 to 100 parts by weight may be used for desired special applications with low cost.

Further, in this invention, calcium fluoride may be used. Calcium fluoride can be obtained from a natural fluorite or the one obtained by dissolving calcium carbonate or calcium hydroxide by hydrofluoric acid solution and evaporating water from it.

Use of calcium fluoride in this invention will increase fluidability at the time of molding the non-flammable phenolic resin foam and also enhance the shape-holding effect of the non-flammable phenolic resin foam while it is heated, because of the excellent properties of calcium fluoride as a fusing agent.

The optimum mixing ratio of calcium fluoride is 5 to 30 parts by weight against 30 to 100 parts by weight of resol type phenolic resin.

Further, in this invention, use of glass fiber is also possible. The glass fiber to be used is short fiber, that is, 13 μm or less in diameter and 3 to 8 mm in length. Generally the smaller the diameter of glass fiber, the higher the tensile strength per unit cross-sectional area. Therefore, by making the diameter of the fiber 13 μm or less, 10 kgf/cm$^2$ or more tensile strength is obtained. By making the glass fiber length between 3 and 8 mm, entanglement of fiber at the time of mixing is avoided and the fibers can be dispersed evenly.

For manufacturing the non-flammable phenolic resin foam, some mixing agents or inorganic pigment, other than the above-mentioned major components, such as, dispersing agent, anti-bacterial agent, anti-fungal agent or stabilizer may be used to enhance various properties of the materials.

In order to improve extrudability and moldabilty, adding thickener, such as methylcellulose, carboxymethyl cellulose is also permitted. To enhance fire resistance, titanium powder or alumina powder may also be added.

In this invention, the above-mentioned components are added with the water and then mixed.

Here, the water volume is preferred in 30 to 100 parts by weight against 30 to 100 parts by weight of resol type phenolic resin, but is not limited to the range.

Next, the mixed object is subjected to pressmolding. As for the pressmolding molding method, use of many method, such as casting-compression molding, injection molding or extrusion molding is possible. It is preferred to pressurize at the pressure of 5 to 500 kgf/cm$^2$.

In case of casting-compression molding, cast the material into the mold and apply 5 to 20 kgf/cm$^2$ pressure over the material. The molded material may be heated at 50 to 150° C. for 120 min. to effect curing while slight foaming.

The non-flammable phenolic resin foam of this invention which includes ceramic micro-hollow particles, inorganic filling agent, aluminum hydroxide and the like as filling agent of phenolic resin, the material has light weight and smooth surface which could not be obtained in any of the conventional phenolic resin foam.

Each surface of ceramic micro-hollow particals is contacted at its tangential point bound with the phenolic resin. Inorganic filling agent and aluminum hydroxide are added to fill partly the space between particles. Therefore, the product has light weight with smooth surface. When it is heated during a fire, inorganic filler bind the contacting points of the ceramic micro-hollow particles, instead of phenolic resin, to make the strength of the material still higher. Thus, a non-flammable phenolic resin foam having smooth surface, and less water absorptive, dense and with high physical strength and excellent heat insulation can be produced. In comparison, the phenolic resin foam of the prior art is, as it is formed by foaming with large amount of foaming agent only, the bubbles or voids by foaming are relatively large and joined each other to invite high water absorption and insufficient physical strength.

This invention is explained by several example of embodiments, though the invention is not limited to those examples of embodiments.

EXAMPLE 1

100 parts by weight of resol type phenolic resin, 5 parts by weight of methylene chloride as a foaming agent, 750 parts by weight of ceramic micro-hollow particles consisting of complete hollow particles having compression strength 700 kgf/cm$^2$, bulk density 0.3 to 0.5 g/cm$^3$, melting point 1600° C. and heat conductivity 0.1 kcal/.m.hr. °C., 200 parts by weight of glass powder, 200 parts by weight of aluminum hydroxide, 100 parts by weight of water, 0.3 parts by weight each of dispersing agent and stabilizer (mixing agents) were sufficiently kneaded. Into this, 50 parts by weight of phosphoric acid family curing agent was added and kneaded further. The product was then poured into a mold to make it into a plate form. Its surface was press molded at 10 kgf/cm$^2$ pressure and then heated it for 70 min. at 125° C. to cure while slight foaming. With the phenolic resin foam thus obtained (bulk density 0.56 g/cm$^3$), a 220×220×15 (mm) test specimen was made. With this, a surface heating test (as per Notification No. 1828 issued by the Japan Ministry of Construction) was conducted. While it was gradually heated in the heating furnace (until the temperature of the exhaust gas caused by heating reaches 305° C. within 10 min.), there was no harmful gas emission nor melting nor cracking detected in the test specimen. There was no remaining flame after finishing heating. The temperature curve of the exhaust gas during heating did not exceed the predetermined standard temperature curve. There was no smoke and the smoking coefficient was 0.

EXAMPLE 2

70 parts by weight of resol type phenolic resin, 5 parts by weight of methylene chloride as a foaming agent, 600 parts by weight of ceramic micro-hollow particles consisting of complete hollow particles having compression strength 700 kgf/cm$^2$, bulk density 0.3 to 0.5 g/cm$^3$, melting point 1600° C. and heat conductivity 0.1 kcal/m.hr. °C., 40 parts by weight of glass powder, 150 parts by weight of aluminum hydroxide, 25 parts by weight of phosphate, 13 parts by weight of calcium fluoride, 50 parts by weight of water, 0.3 parts by weight each of dispersing agent and stabilizer (mixing agents) were sufficiently kneaded. Into this, 50 parts by weight of phosphoric acid family curing agent was added and the material was kneaded further. The product was then poured into the mold to make it into a plate form. It was press molded on its surface at 10 kgf/cm$^2$ and then cured at 130° C. for 80 minutes for hardening.

With the phenolic resin foam thus obtained (bulk density 0.56 g/cm$^3$), a surface heating test was conducted in the same manner as in the Example 1 above. There was no harmful gas emission nor melting nor cracking detected. There was no remaining flame after finishing heating. The temperature curve of the exhaust gas during heating did not exceed the standard temperature curve. There was a little amount of smoking and the smoking coefficient was 30 or less.

EXAMPLE 3

100 parts by weight of resol type phenolic resin, 0.5 parts by weight of methylene chloride as a foaming agent, 30 parts by weight of ceramic micro-hollow particles consisting of complete hollow particles having compression strength 700 kgf/cm$^2$, bulk density 0.3 to 0.5 g/cm$^3$, melting point 1600° C., heat conductivity 0.1 kcal/m.hr. °C., 2.5 parts by weight of glass powder, 70 parts by weight of aluminum hydroxide, 50 g of water, 0.3 parts by weight each of dispersing agent and stabilizer(mixing agents) were sufficiently kneaded. Into this, 20 parts by weight of phosphoric acid family curing agent was added and the material was kneaded further. The product was then poured into the mold to make it into a plate form. It was press molded at 10 kgf/cm$^2$ pressure and then heated for 10 minutes at 60° C. to cure while foaming.

With the non-flammable phenolic resin foam (bulk density 0.51 g/cm$^3$) thus obtained, a surface heating test was conducted in the same manner as in the case of example 1. There was no harmful gas emission, nor melting nor cracking was detected. There was no remaining flame after finishing heating. The temperature curve of the exhaust gas during heating did not exceed the standard temperature curve. There was a little smoking and the smoking coefficient was 30 or less.

EXAMPLE 4

100 parts by weight of resol type phenolic resin, 0.5 parts by weight of methylene chloride as a foaming agent, 40 parts by weight of ceramic micro-hollow particles consisting of complete hollow particles having compression strength 700 kgf/cm$^2$, bulk density 0.3 to 0.5 g/cm$^3$, melting point 1600° C. and heat conductivity 0.1 kcal/m.hr. °C., 2.5 parts by weight of glass powder, 45 parts by weight of aluminum hydroxide, 50 g of water, 0.3 parts by weight each of dispersing agent and stabilizing agent were sufficiently kneaded. Into this, 20 parts by weight of phosphoric acid family curing agent was added and the material was kneaded further. The product was then poured into the mold to make it into a plate form. It was press molded at 10 kgf/cm² pressure and then heated at 60° C. to cure while slight foaming.

With the phenolic resin foam thus obtained (bulk density 0.51 g/cm³), a surface heating test was conducted in the same manner as was done in the example 1 above. There was no harmful gas emission nor melting nor cracking detected. There was no remaining flame after finishing heating. The temperature curve of the exhaust gas during heating did not exceed the standard temperature curve. There was only a small amount of smoke and the smoking coefficient was 30 or less.

EXAMPLE 5

100 parts by weight of resol type phenolic resin, 5 parts by weight of methylene chloride as a foaming agent, 750 parts by weight of ceramic micro-hollow particles consisting of complete hollow particles having compression strength 700 kgf/cm², bulk density 0.3 to 0.5 g/cm³, melting point 1600° C. and heat conductivity 0.1 kcal/m.hr. °C., 200 parts by weight of glass powder, 200 parts by weight of aluminum hydroxide, 25 parts by weight of glass fiber (13 μm diameter and 6 mm length), 80 parts by weight of water, 0.3 parts by weight each of dispersing agent and stabilizing agent (mixing agents) were mixed and sufficiently kneaded. Into this, 20 parts by weight of phosphoric acid family curing agent was added and the material was kneaded further. The product was then poured into the mold to make it into a plate form. It was press molded at 50 kgf/cm² pressure and then heated for 70 min. at 125° C. to cure while slight foaming.

With the phenolic resin foam (bulk density 0.58 g/cm³ bending strength 325 kg/cm², water absorbing ratio 2%) thus obtained, a surface heating test was conducted in the same manner as in the Example 1 above. There was no harmful gas emission nor melting nor cracking detected. There was no remaining flame after finishing heating. The temperature curve of the exhaust gas during heating did not exceed the standard temperature curve. There was a slight amount of smoke and the smoking coefficient was 30 or less.

EXAMPLE 6

100 parts by weight of resol type phenolic resin, 5 parts by weight of methylene chloride as a foaming agent, 750 parts by weight of ceramic micro-hollow particles consisting of complete hollow particles having compression strength 700 kgf/cm², bulk density 0.3 to 0.5 g/cm³, melting point 1600° C., heat conductivity 0.1 kcal/m.hr. °C., 40 parts by weight of glass powder, 150 parts by weight of aluminum hydroxide, 25 parts by weight of phosphate, 13 parts by weight of calcium fluoride, 12.5 part by weight of glass fiber (13 μm diameter and 6mm length), 50 parts by weight of water, 0.3 parts by weight each of dispersing agent (mixing agent) and stabilizing agent were mixed and sufficiently kneaded. Into this, 50 parts by weight of phosphoric acid type curing agent was added and it was kneaded further. The product was then poured into the mold to be made in a plate form. It was press molded at the 50 kgf/cm² pressure and then heated for 80 min. at 130° C. to cure while slight foaming.

With the phenolic resin foam thus obtained (bulk density 0.57 g/cm³), bending strength 280 kg/cm², water absorbing ratio 2.4%), a surface heating test was conducted in the same manner as in the example 1 above. There was no harmful gas emission, nor melting nor cracking detected. There was no remaining flame after finishing heating. The temperature curve did not exceed the standard temperature curve. There was a little amount of smoking and the smoking coefficient was 30 or less.

What is claimed is:

1. A process for producing non-flammable phenolic resin foam which comprises mixing 30 to 100 parts by weight of resol type phenolic resin, 0.3 to 10 parts by weight of foaming agent, 10 to 50 parts by weight of curing agent, 30 to 800 parts by weight of ceramic micro-hollow particles (compression strength of 600 kgf/cm² or more, bulk density of 0.3 to 0.5 g/cm³ and melting point 1500° C. or more), 2 to 250 parts by weight of inorganic filling agent, 40 to 250 parts by weight of aluminum hydroxide with water, press molding and heating for curing.

2. A process for producing non-flammable phenolic resin foam which comprises mixing 30 to 100 parts by weight of resol type phenolic resin, 0.3 to 10 parts by weight of foaming agent, 10 to 50 parts by weight of curing agent, 30 to 800 parts by weight of ceramic micro-hollow particles having compression strength of 600 kgf/cm² or more, bulk density of 0.3 to 0.5 g/cm³ and melting point 1500° C. or more), 2 to 250 parts by weight of inorganic filling agent, 40 to 250 parts by weight of aluminum hydroxide, 5 to 50 parts by weight of phosphate, 5 to 30 parts by weight of calcium fluoride with water, press molding and heating for curing.

3. A process for producing non-flammable phenolic resin foam which comprises mixing 30 to 100 parts by weight of resol type phenolic resin, 3 to 10 parts by weight of foaming agent, 10 to 50 parts by weight of curing agent, 100 to 800 parts by weight of ceramic micro-hollow particles (compression strength of 600 kgf/cm² or more, bulk density of 0.3 to 0.5 g/cm³ and melting point of 1500° C. or more), 20 to 250 parts by weight of inorganic filling agent, 100 to 250 parts by weight of aluminum hydroxide with water, press molding and heating for curing.

4. A process for producing non-flammable phenolic resin foam which comprises mixing 30 to 100 parts by weight of resol type phenolic resin, 3 to 10 parts by weight of foaming agent, 10 to 50 parts by weight of curing agent, 100 to 800 parts by weight of ceramic micro-hollow particles (compression strength of 600 kgf/cm² or more, bulk density of 0.3 to 0.5 g/cm³ and melting point of 1500° C. or more), 20 to 250 parts by weight of inorganic filling agent, 100 to 250 parts by weight of aluminum hydroxide, 10 to 50 parts by weight of phosphate, 5 to 30 parts by weight of calcium fluoride with water, press molding and heating for curing.

5. A process for producing non-flammable phenolic resin foam which comprises mixing 100 parts by weight of resol type phenolic resin, 0.3 to 5 parts by weight of foaming agent, 10 to 30 parts by weight of curing agent, 30 to 100 parts by weight of ceramic micro-hollow particles (compression strength of 600 kgf/cm² or more, bulk density of 0.3 to 0.5 g/cm³ and melting point of 1500° C. or more), 2 to 40 parts by weight of inorganic filling agent, 40 to 80 parts by weight of aluminum hydroxide with water, press molding and heating for curing.

6. A process for producing non-flammable phenolic resin foam which comprises mixing 100 parts by weight of resol type phenolic resin, 0.3 to 5 parts by weight of foaming agent, 10 to 30 parts by weight of curing agent, 30 to 100 parts by weight of ceramic micro-hollow particles (compression strength of 600 kgf/cm² or more, bulk density of 0.3 to 0.5 g/cm³ and melting point of 1500° C. or more), 2 to 40 parts by weight of inorganic filling agent, 40 to 80 parts by weight of aluminum hydroxide, 5 to 30 parts by weight of phosphate and 5 to 30 parts by weight of calcium fluoride with water, press molding and heating for curing.

7. A process for producing non-flammable phenolic resin foam which comprises mixing 100 parts by weight of resol type phenolic resin, 3 to 10 parts by weight of foaming agent, 10 to 50 parts by weight of curing agent, 400 to 800 parts by weight of ceramic micro-hollow part particles (compression strength of 600 kgf/cm$^2$ or more, bulk density of 0.3 to 0.5 g/cm$^3$ and melting point of 1500° C. or more), 100 to 250 parts by weight of inorganic filling agent, 100 to 250 parts by weight of aluminum hydroxide, 5 to 30 parts by weight of glass fiber (13 μm or less in diameter, 3 to 8 mm in length) with water, press molding and heating for curing.

8. A process for producing non-flammable phenolic resin foam which comprises mixing 100 parts by weight of resol type phenolic resin, 3 to 10 parts by weight of foaming agent, 10 to 50 parts by weight of curing agent, 400 to 800 parts by weight of ceramic micro-hollow particles (compression strength of 600 kgf/cm$^2$ or more, bulk density of 0.3 to 0.5 g/cm$^3$ and melting point of 1500° C. or more), 100 to 250 parts by weight of inorganic filling agent, 100 to 250 parts by weight of aluminum hydroxide, 10 to 50 parts by weight of phosphate, 10 to 30 parts by weight of calcium fluoride, 5 to 30 parts by weight of glass fiber (13 μm or less in diameter and 3 to 8 mm in length) with water, press molding and heating for curing.

* * * * *